(12) United States Patent  
Muehlemann et al.

(10) Patent No.: US 7,364,335 B2
(45) Date of Patent: Apr. 29, 2008

(54) MODULAR OPTICAL LIGHT LINE UNIT

(75) Inventors: Michael Mark Muehlemann, Liverpool, NY (US); Darryl Alexander Thomas, Cato, NY (US); Robert John Catterfeld, Asheville, NC (US)

(73) Assignee: Illumination Technologies, Inc., East Syracuse, NY (US)

( * ) Notice: Subject to any disclaimer, the term of this patent is extended or adjusted under 35 U.S.C. 154(b) by 0 days.

(21) Appl. No.: 11/499,423

(22) Filed: Aug. 4, 2006

(65) Prior Publication Data

US 2008/0037273 A1  Feb. 14, 2008

(51) Int. Cl.
  *F21V 7/04* (2006.01)
(52) U.S. Cl. ............... 362/555; 362/554; 362/581; 385/62; 385/901
(58) Field of Classification Search ........... 362/554, 362/555, 581, 901; 385/120, 121, 62, 901
  See application file for complete search history.

(56) References Cited

U.S. PATENT DOCUMENTS 5,550,946 A * 8/1996 Muehlemann et al. ...... 385/121
6,832,849 B2 * 12/2004 Yoneda et al. ............... 362/555

* cited by examiner

*Primary Examiner*—Stephen F. Husar
(74) *Attorney, Agent, or Firm*—Bernhard P. Molldrem, Jr.

(57) ABSTRACT

A modular fiber optic light line unit has a housing in which distal portions of one or more fiber optic bundles fan out such that termini of the fibers are arrayed in a continuous fiber row. The proximal ends of the bundles are held in respective sleeves, and light source modules are removably attached over the sleeves to generate light that is incident on the proximal end of the bundle. The light source modules are removably installed by pushing on, without requiring tools. The light source modules have a canister housing containing a solid-state light source, e.g., five watts. Heat management is achieved using fins on the modular housing. Different color wavelength light sources can be employed, and the fibers from the various bundles can be interleaved.

12 Claims, 2 Drawing Sheets

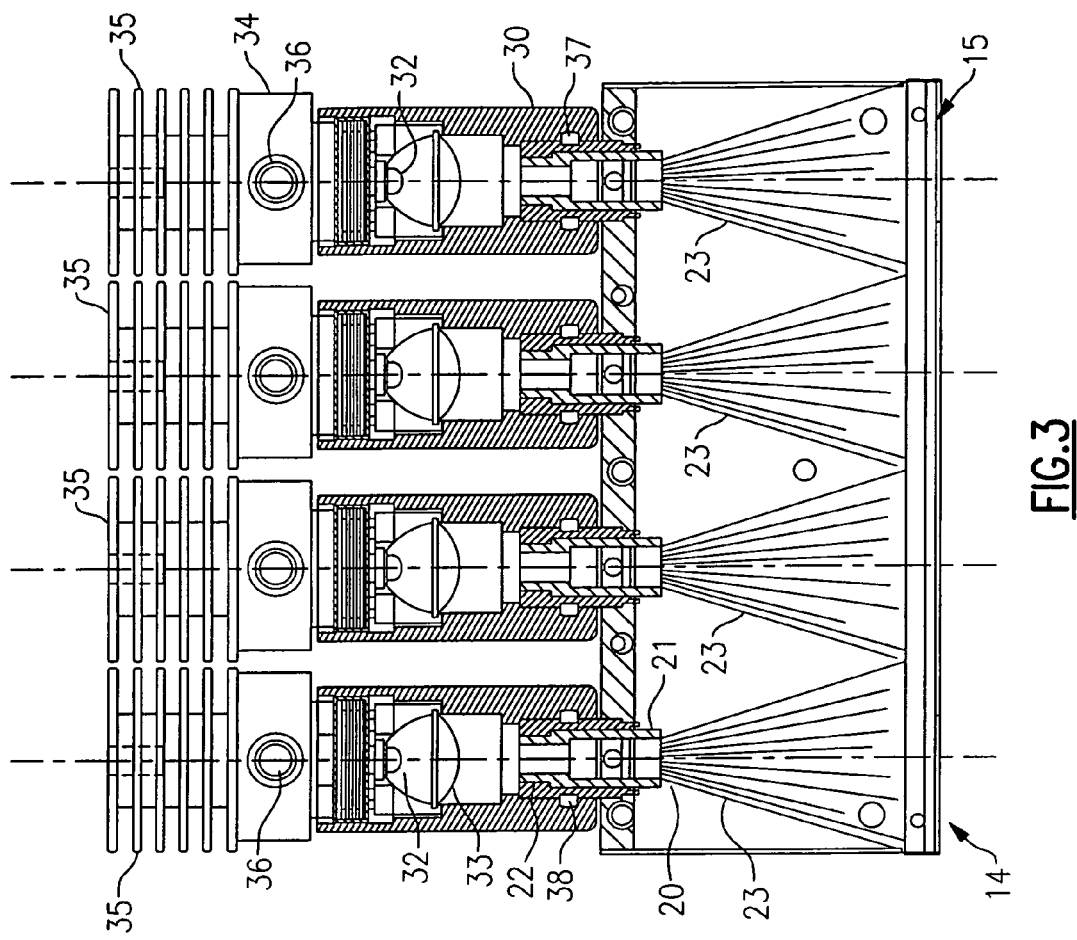
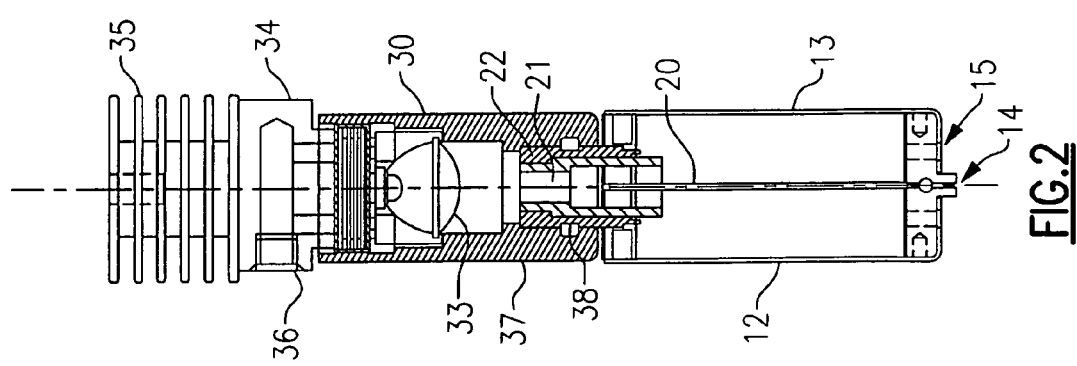

MODULAR OPTICAL LIGHT LINE UNIT

BACKGROUND OF THE INVENTION

This invention relates to apparatus for illuminating an object and for providing a uniform, thin line of light onto an object for line scan applications. The invention relates to light line units of modular design that can used individually or can be butted end to end to provide very long, seamless linear beams of light. The invention is more particularly directed to an optical fiber based unit which includes an internal light source and where the fibers convert the illumination from that source into a thin, long line of light.

Modular light line units of this general type are discussed in U.S. Pat. No. 5,550,946. In the modular units of that design, there is a bundle of optical fibers that fan out into a single row of fibers, in a manner that allows the units to be placed end to end to create a long line of light. The housings for these light line units are in the form of top and bottom jaws, and these jaws may be formed with triangular teeth to hold the optical fibers in place. In some versions, the jaws may be smooth on one side or on both sides. In addition, an external light source was employed, which required using a light conduit to extend from the light source to the light line module, and typically a separate light source would be needed for each module.

Light line units can be employed in a variety of applications where a long, narrow strip of light is needed. Light line units can be used in line-scan applications, e.g., with line-scan type CCD cameras in web-type applications, i.e., for endless belt inspection or for inspection of carpeting. Fluorescent tubes have been employed behind an elongated aperture to produce a line of light. The fluorescent tube light line units have difficulty producing a line of light that is uniform from one end of the line to the other, or a light that remains uniform over time. The fluorescent units have temperature-sensitive output fluctuations, and outputs that vary with age and with other conditions. Also, if two units are to be joined to provide a light line of extra length, there is additional illumination drop-off between modules.

One type of optical fiber line illuminators is described in U.S. Pat. No. 4,952,022 to Genovese. There, the illuminating device is comprised of a bundle of large-diameter fibers, in which the distal ends or termini are deformed into a rectangular cross section, the idea being production of a linear beam that is uniform along the output of the array. However, that patent does not address how to join two or more units to produce a very long linear beam. In addition, an external light source is required for each unit. Other fiber based systems for transmitting a linear beam of light from a lamp to a workpiece are described in U.S. Pat. No. 3,192,843 to Kapany et al.

In a number of industrial applications, it is necessary to provide a line of illumination up to several meters in length, and with uniformities of better than 90% in a transmission or reflective mode. A typical application can be automated quality inspection of a web type product that travels past, for example a fabric or carpet. The quality of the inspection depends entirely on the uniformity of the light source, that is, on uniformity across the light line. Such high uniformity has been difficult to achieve using standard techniques, such as apertured fluorescent lamps. In addition, inspection of heat-sensitive materials requires remoting the light source from the product, and this has been impossible where conventional linear light sources need to be in proximity to the product.

Replacement of light sources, or of the lamps for the light sources has been a problem as well, as each lamp is expensive and produces significant heat, so it must be situated away from the workpiece being inspected. No one has previously proposed an internal light source for a modular fiber optic light line, nor has anyone proposed a modular lamp replacement that is simple and convenient to adjust or replace.

OBJECTS AND SUMMARY OF THE INVENTION

It is an object of the present invention to provide a lightline arrangement that creates a continuous, linear beam of light without gaps or discontinuances in the beam of light from one end to the other.

It is another object to provide a light line unit, that produces a linear light beam, i.e., a line of light that is uniform across its length and creates a seamless, long line of uniform illumination.

It is a more specific object to provide a modular light line unit which employs an incorporated or integral light source or light sources, to minimize the length of optical fiber needed.

It is a further object to provide a light line that employs an LED light source with significantly enhanced thermal management capabilities.

It is another object to provide a light line unit that can be reconfigured with all the fibers carrying the same wavelength(s) or with the various fibers carrying different wavelengths, as needed to meet varying application needs.

According to an aspect of the invention, a modular fiber optic light line unit produces a thin, continuous line of illumination. These units can be used singly, or a number of these units can be joined together end to end to produce a long, seamless linear light beam. The modular light line unit has a housing with a flat, narrow distal face from which the line of light emanates. A fiber optic bundle, formed of a plurality of optical fibers, fans out from its proximal end, where it receives the illumination from the incorporated light source, into the row of fibers at the distal end. At the proximal end of the bundle there is a coupling that connects to the light source. The distal ends or termini of the fibers are arrayed in a single-thickness row of fibers that extends over the length of the distal face of the housing from one end edge to the other end edge. The housing may contain structure that holds the termini of the fibers in a continuous row to define the light line. The housing may be formed of first and second halves that meet at this line with the optical fibers held in place therebetween. One of the two halves or jaws may have triangular teeth to hold the fibers in place, with the other jaw being flat. Alternatively, the teeth may be cylindrical scores, or another mechanical configuration that aligns the fibers. The alignment may also be controlled during manufacture with automated assembly procedures that lock the fibers into the correct positions, in which case these teeth may be omitted and both jaws may be flat. The row of fibers has its ends flush with the first and second end edges of the distal face member of the housing. In this fashion, when two or more modular units are butted together, there are no gaps in the combined rows of optical fibers, and the light line from the several units is presented as a continuous, seamless thin linear beam, without drop-out between units. The light line units can be used for white light, color light, false color light (i.e., alternate fibers being red, green, and blue), infrared, or ultraviolet illumination.

The term "row" as used in the description and claims, can mean either a single-layer row, i.e., one fiber wide, or a multi-layer row, i.e., two or more fibers wide.

In the case of multiple wavelengths, each individual fiber output may be purposely positioned in an organized manner to provide a specific output. In the case of two wavelengths, e.g., red and green, the fiber outputs may be positioned R-G-R-G-R-G, etc. In the case of three or more outputs, these may be alternated A-B-C-A-B-C-A-B-C, etc. In a four-bundle, four-light source arrangement, the fiber termini may be alternated in a fashion A-B-C-D-A-B-C-D, etc. For false color applications, the red, blue, and green fibers may be positioned R-G-B-R-G-B-R-G-B, etc; and for photometric applications, R-G-B-G-R-G-B-G, etc. The light sources may emit white, infrared, ultraviolet, or respective specific color wavelengths, as desired for the given application.

The housing can be made of anodized aluminum, stainless steel, or other suitable material, and the optical fibers can be polymer fibers, for example with a diameter of 0.030 inches. The fiber cross-section may be circular, or may be square, rectangular, or hexagonal. Other cross section of waveguide may be employed as well.

The incorporated light sources, which may preferably be plug-in modules, employ an LED light source, operating at about 5 watts, which may employ passive convection as a thermal management solution. The LED light sources may be controlled with constant current supplies to ensure stability. The photonic output of each device can be monitored and used to adjust the output to compensate for light degradation (i.e., light feedback). The intensity set point may be controlled remotely, e.g., via an Ethernet interface.

The fibers can be situated at a right angle to the distal face, or they may be situated at a predetermined slant angle, e.g., about 30 degrees, so that the light exits the unit at a desired angle with respect to the front face of the unit, and impinges on the web at a slant angle. In this case, the termini of the fibers may be angled to be flush with the face member of the housing. The slant angle of the fibers combined with the further refractive bending at the termini of the fibers causes the light to impinge onto the web at a finite predetermined angle (e.g., 45°) relative to the normal. This reveals any linear defects, e.g., folds, cracks, and the like, that are oriented in the travel direction of the web.

The above and many other objects, features, and advantages of this invention will become apparent from the ensuing description of a preferred embodiment, which should be read in connection with the accompanying Drawing.

BRIEF DESCRIPTION OF THE DRAWING

FIG. 2 is an sectional end view of this embodiment.

FIG. 3 is a sectional side elevational view of this embodiment.

DETAILED DESCRIPTION OF THE PREFERRED EMBODIMENT

Figure 1:
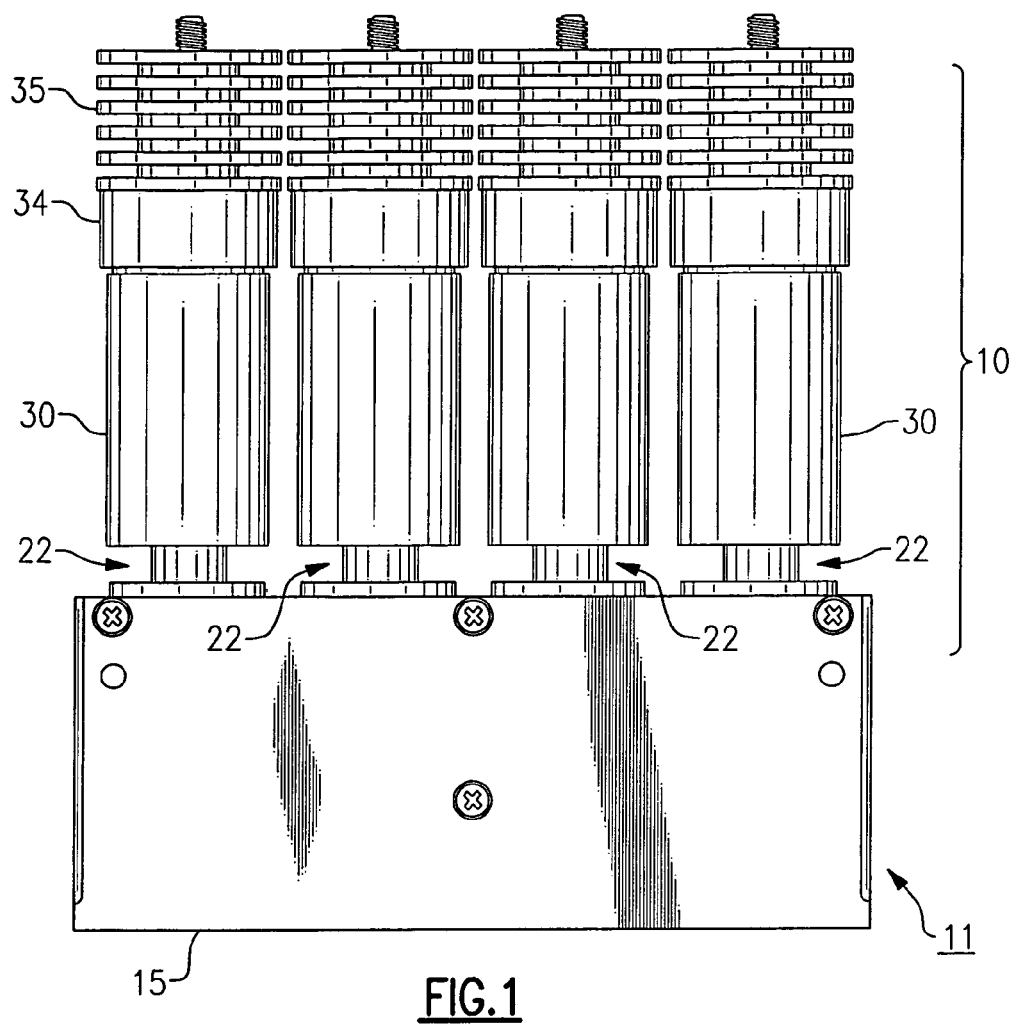
FIG. 1 is a side elevation of a modular light line unit according to one embodiment of this invention.
Figure 1A:
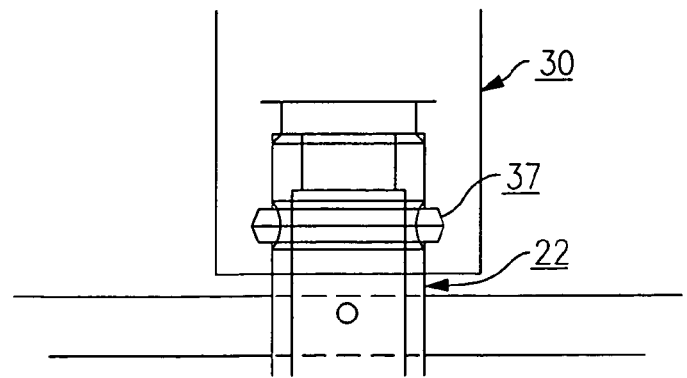
FIG. 1A shows detail of a portion of FIG. 1.

With reference to FIGS. 1 to 3 of the Drawing, a modular light line unit 10 has a housing or casing 11 formed of a first housing half 12 and a second housing half 13. These halves 12, 13, better viewed in FIG. 2, are preferably made of a cast anodized aluminum, although many other suitable materials exist. The halves fit together at a join line 14. At a lower or distal side of the housing 11 forms an elongated flat distal face 15, where the join line 14 defines a light line, and from the latter emanates the light line or linear beam of illumination.

As shown in FIGS. 2 and 3, there is at least one fiber optic bundle 20 contained in the housing 11, and in this embodiment there are four bundles 20. Each fiber optic bundle 20 has a proximal or upper end 21, which is bound and housed within a ferrule 22. In this embodiment there are four ferrules 22, and each projects out the upper or proximal side of the housing or casing 11. Within the housing 11, a distal portion 23 of each fiber optic bundle fans out and extends to the join line 14 where the individual fibers terminate. Here the fibers are aligned in a single row. Alternatively, the fibers may be arranged in a multi-layer row. These fibers may be held in place by grooves or teeth (not shown) formed along the join line 14 at the distal end of one or both halves 12, 13. As aforesaid, these may be cylindrical scorings or angulated, i.e., triangular teeth. Alternatively, the fibers may be aligned in a manufacturing process for constructing the light line, and held in place without teeth or groove structure. Here, in FIG. 3, for sake of simplicity the distal portion 23 of each bundle 20 is shown as terminating in its own sector of the light line unit. However, in practice the fibers of the four bundles 20 can be interleaved, i.e., in a fashion such as A-B-C-D-A-B-C-D, etc.

At the top or proximal side of the housing 11 are a set of light source modules 30, each of which plugs onto a respective one of the ferrules 22, so that the light that it generates is incident onto an associated one of the fiber bundles. In this embodiment, the light source modules each have a housing or casing 31 that is generally cylindrical or canister shaped, and having an internal cavity with a generally cylindrical bore at its lower end. Within the cavity in the housing 31 is a high intensity LED 32, e.g., five watts, and emitting a selected wavelength or band of wavelengths. Focusing optics 33, e.g., a focusing lens group, are present just below the LED 32 to focus the light therefrom to be incident on the proximal end of the respective fiber bundle 20. There may also be supporting electronic circuitry (not shown here) within the module 30. Each module 30 has a power and thermal portion 34 situated above the housing or casing 31. This may be threaded to screw into the housing 31. This portion is preferably aluminum or another good heat conductor, and serves to carry heat generated by the LED 32 up to a series of fins 35. The portion 32 also has a socket for receiving a power plug (not shown) from a power cord or conductor. Passive heat conduction is employed here, but in other embodiments a heat pipe may be used, or active Peltier cooling. Active cooling may be preferable if the solid state light source is integrated within the light line unit housing 11.

Each light source module 30 is configured to snap fit in place onto the respective ferrule 22, and to remain securely in place until it is deliberately pulled off the ferrule 22. In this embodiment, the lower bore of each module housing 31 has an annular spring 37 fitted into a recess formed in the wall of the lower bore, and this mates with an annular recess 38 on the ferrule 22. The spring 37 serves as a spring clamp to hold the light source module housing 31 in place on the associated ferrule. Alternatively, a ball spring arrangement can be used. When the module 30 is grasped and pulled up firmly, the spring 37 will yield and release from the annular recess, so the module can be removed by hand, i.e., without use of tools. This feature permits quick change-over in the event of a light source failure or if a different lighting configuration is desired. Detail of this structure is shown in FIG. 1B. This feature also ensures correct optical alignment, which is of great value in practical applications. In other embodiments, structure other than the annular spring 37 and recess 38 could be employed, e.g., a ridge or flange.

While the illustrated embodiment shows the light line module employing four fiber bundles 20, other embodiments are possible, e.g., employing a single fiber optic bundle or employing two, three, or more than four fiber bundles and a corresponding number of light source modules.

Here, each fiber optic bundle 20 fans out into a single layer, and ends or termini 28 of the optical fibers are arranged side-by-side into a single row to form the light line 14 on the face 15. In this embodiment, the ends of the row of optical fibers are flush with the end edges of the face 15 at the ends of the case or housing 11. This permits a number of the modular units 10 to be joined end to end to form a single uninterrupted light line. Most favorably, each terminus is configured and polished for optimal light distribution.

An optional cylindrical lens (not shown here) may be disposed with its cylindrical axis across the linear beam of light. In many possible configurations, another type of lens or collimator could be employed.

While the invention has been described with reference to a single preferred embodiment, it should be recognized that the invention is not limited to that precise embodiment. Rather, many modifications and variations will be apparent to persons skilled in the art without departing from the scope and spirit of this invention, as defined in the appended claims.

We claim:

1. Modular optical light line unit for producing a thin, continuous, line of illumination, comprising
    a light line module housing having a distal face from which said line of illumination emanates, the distal face having a first end edge and a second end edge;
    a fiber optic bundles formed of a plurality of optic fibers, said bundles each having a proximal end and a distal end, the bundle being fanned out within the light line module housing to terminate in a flat linear array such that the distal end is arrayed as a row of fibers;
    a ferrule disposed on said housing at a proximal side of said housing and in which the proximal end of said fiber optic bundle is contained; and
    a snap-fitting solid-state light source module adapted to install upon said ferrule by pushing it in place, and which remains in place until deliberately pulled off, including
        a light source module housing;
        a solid-state light emitting device within said light source module housing; and
        a snap-action fitting on said module adapted to mate with said ferrule such that the illumination produced by the solid state light emitting device is incident upon the proximal end of said fiber optic bundle.

2. Modular optical light line unit according to claim 1, wherein said solid-state light source includes means to dissipate heat produced by the solid-state light emitting device therein.

3. Modular optical light line unit according to claim 2, wherein said means to dissipate includes a plurality of fins on said light source module housing.

4. Modular optical light line unit according to claim 1, wherein said housing includes a focusing lens group between the solid-state light emitting device and the proximal end of the fiber optic bundle.

5. Modular optical light line unit according to claim 1, wherein said fitting includes a retaining spring for removably securing to an annular retaining structure on said ferrule, so that the light source module can be installed or removed without use of tools.

6. Modular optical light line unit according to claim 1, wherein said solid state light source module housing incorporates an electrical socket for receiving a plug-in electrical power connector.

7. A modular optical light line unit for producing a thin, continuous, linear beam of illumination, comprising
    a light line module housing having a distal face from which said line of illumination emanates, the distal face having a first end edge and a second end edge;
    a plurality of fiber optic bundles, each bundle being formed of a plurality of optic fibers, with each bundle including a proximal portion and a distal portion disposed within said light line module housing, with the optic fibers in the distal portions being fanned out to terminate in a flat linear array from said first end edge to said second end edge;
    a plurality of ferrules, each disposed on said light line module housing at a proximal side of said light line module housing and within which the proximal end of an associated one of said fiber optic bundles terminates; and
    a plurality of solid-state light source modules, each being adapted to install upon a respective one of said ferrules, and each including
        a module housing;
        a solid-state light emitting device within said module housing; and
        a snap-action fitting on said module adapted to mate with the associated ferrule such that the illumination produced by the solid state light emitting device is incident upon the proximal end of the respective one of said fiber optic bundles, each said snap-action fitting being adapted to install upon the respective ferrule by pushing it in place, and which remains in place until deliberately pulled off.

8. The modular optical light line unit according to claim 7 wherein there are four of said fiber optic bundles, four respective ferrules and four respective solid-state light source modules.

9. The modular optical light line unit according to claim 8 wherein said the termini of the fibers of said fiber optic bundle are interleaved to alternate in a successive repetitive order.

10. The modular optical light line unit according to claim 9 wherein said solid-state light source modules produce respective specific color wavelengths.

11. The modular optical light line unit according to claim 7 wherein said solid-state light source modules produce respective specific color wavelengths.

12. The modular optical light line unit according to claim 7 wherein said solid state light source module housings are generally cylindrical in shape.

* * * * *